Nov. 16, 1971  F. H. BRATTON ET AL  3,620,166

RADIANT ENERGY SIGNAL TRANSMISSION SYSTEM

Filed Dec. 24, 1968

INVENTORS
FRANCIS H. BRATTON
JOHN M. SMITH
BY *Lindsey, Prutzman and Hayes*

ATTORNEYS

United States Patent Office 3,620,166
Patented Nov. 16, 1971

3,620,166
RADIANT ENERGY SIGNAL TRANSMISSION
SYSTEM
Francis H. Bratton, Avon, and John M. Smith, Simsbury,
Conn., assignors to The Ensign-Bickford Company,
Simsbury, Conn.
Filed Dec. 24, 1968, Ser. No. 786,586
Int. Cl. F42b 23/20, 3/18, 3/16
U.S. Cl. 102—70.2 A                               8 Claims

ABSTRACT OF THE DISCLOSURE

A new and highly practical signal transmission system utilizing a radiant energy signal unaffected by adverse operating conditions provides for the operation of a work function at a work station located remotely from the source of the radiant signal. The system includes the transmission of a noncoherent light signal of high intensity along a light transmitting conduit to a sensitive pyrotechnic or explosive relay device capable of absorbing attenuated light signals and emitting an amplified light signal along additional lengths of conduit to the remotely located work station. The relay device, which may be hermetically sealed, beneficially incorporates a pyrotechnic delay material for accurately controlling and synchronizing the receipt of the signal at a plurality of isolated work stations.

BACKGROUND AND SUMMARY OF THE INVENTION

The present invention relates to signal transmission systems. In particular it is concerned with systems utilizing radiant energy signals and with signal relay units which receive and transmit useful information to remote locations within such systems.

Heretofore the transmission of information in the form of signals or commands has been accomplished by utilizing electrical and/or chemical energy transmission systems. The transmission lines of such systems are generally characterized by the ability to rapidly convey the appropriate information to isolated or remote work stations. For example, in rocket or booster technology it has conventionally been the practice to utilize electrically or explosively actuated pyrotechnic devices for providing a number of specific work functions. Additionally, electrically conductive leads or explosive signal transmission cords have been employed in blasting, mining and similar operations to ignite a remote work charge. However, these systems are subject to certain inherent deficiences. For example, the electrically conductive leads of a pyrotechnic igniter can be affected by radio frequency interference, buildup of electrostatic charges, shock or high temperatures, any one of which might cause premature or faulty operation of the device. Some explosive transmission systems are also adversely affected by the environment to which they are exposed. In order to eliminate or at least minimize the tendency of such devices to actuate prematurely or operate improperly, it has frequently been necessary to add undesirably heavy and bulky protective coverings.

As an alternative to the electrical and chemical transmission systems, it has been proposed that substantially immune signal transmission systems be developed which utilize a new form of actuating energy unaffected by adverse operating conditions. Radiant energy systems have been mentioned in this connection. These would transmit the activating radiant energy signals from a central or primary energy source along suitable conduits to isolated and remotely located work stations where the numerous functions of the system take place. However, due to the inherent attenuation or dissipation of light upon travel through relatively long lengths of conduit, it had been found that practical application of such systems were limited. This is particularly true for systems that provide a controlled sequence of operations or require delays or other time controls in order to provide synchronous operation at isolated locations spaced from the source of the activating energy. Accordingly, systems using a noncoherent, albeit readily available, light source have not met with success.

Accordingly, it is a primary object of the present invention to provide a new and improved radiant energy transmitting and actuating system which transmits an energy signal having wavelengths within the optical spectrum from an energy source to a work station, the signal being carried along an energy conduit which remains substantially unaffected by adverse environmental conditions.

Another object of the present invention is to provide a system of the type described which employs a signal relay unit at selected locations along the energy conduit for receiving and further transmitting an energy signal.

An additional object of the present invention is to provide a new and improved signal transmission system utilizing a noncoherent light signal conveyed and relayed along light conduits to provide useful work at a work station located remotely from the primary source of the light signal.

Still another object of the present invention is to provide a new and improved light relay unit for a signal transmission system of the type described, which unit is effective in utilizing a radiant energy signal prior to detrimental attenuation thereof and in emitting the amplified signal for further transmission along the radiant energy conduit of the system.

A further object of the present invention is to provide a new and improved light actuating system particularly useful in conjunction with pyrotechnic and detonating devices for providing a specific work function or sequence of operations at isolated locations. This object includes a system which employs light induced ignition of pyrotechnic devices by means of a primary noncoherent light source located remotely from the pyrotechnic devices.

A still further object of the present invention is to provide a new and improved energy transmission system utilizing a relay device responsive to noncoherent light and capable of emitting a noncoherent light signal for further transmission after providing a controlled delay within the light transmission system. This object includes the provision for a plurality of delay units permitting ready selection of the delay to be incorporated into the system.

Still another object of the invention is to accomplish the aforementioned in a simple, facile and economic manner.

Other objects will be in part obvious and in part pointed out more in detail hereinafter.

These and related objects are accomplished in accordance with the present invention by a new and improved energy transmission system capable of conveying a noncoherent light signal of high intensity along a conduit to a light sensitive pyrotechnic or explosive relay device capable of emitting and further transmitting a noncoherent light signal along additional lengths of conduit to a remotely located work station. The relay devices beneficially emit signals which are amplified relative to the attenuated light signals reaching the relay and may provide controlled delay of the signal between the primary light source and the work station without substantially changing the nature of the signal received by and emitted from the device. The relay device suited for effecting this result in a pyrotechnic or explosive system advantageously comprises a tubular member housing a light sensitive pyrotechnic or explosive material and adapted to receive light transparent input and output conduits on opposite ends thereof for receipt and emission of the light signal.

The invention accordingly consists in the features of construction, combination of elements and arrangement of parts which will be exemplified in the construction hereafter set forth.

DESCRIPTION OF PREFERRED EMBODIMENT

The term "optical spectrum" as used herein means a spectrum constituted of the combined ultraviolet, visible and infrared spectra. Accordingly a "signal" or "energy signal" within the optical spectrum comprises a signal having wavelengths falling within that spectral range. The expression "luminous energy" refers to energy within the visible spectrum, that is, energy which by its actions on the organs of vision, enables them to perform their function of sight.

Figure 1:
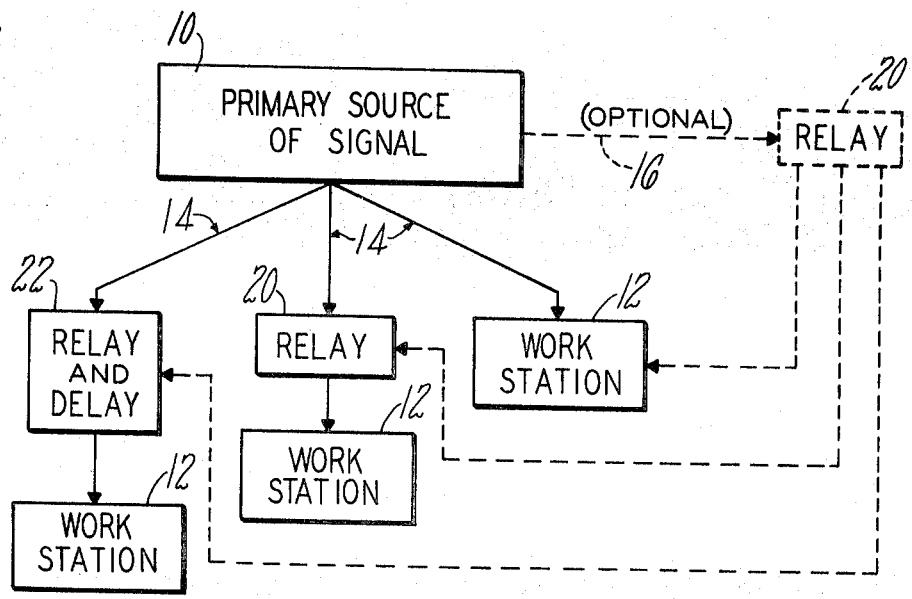
FIG. 1 is a diagrammatic illustration of a light transmission system exemplifying the present invention.

Referring now to the invention in greater detail and particularly to the drawing wherein like reference numerals indicate like parts throughout the several figures, there is outlined in FIG. 1 a signal transmission system operative within the optical spectrum and having a primary or initial source 10 of a radiant energy signal, a plurality of signal responsive work stations 12, and a number of signal conveying conduits 14 for transporting the signals from the source to the work stations. Due to the nature of the signal emitted by the source and the type of conduits employed, it is possible to simultaneously transmit through a plurality of conduits 14 or, optionally, along a single initial conduit 16 for subsequent divergent transmission to the plural work stations 12, as indicated by the broken lines of the diagram.

As mentioned hereinbefore, the transmission of a signal along a lengthy conduit will generally result in appreciable attenuation of the signal where it is a radiant energy signal within the optical spectrum. The system of the present invention overcomes this deficiency and, although useful in conjunction with work stations spaced only a short distance from the primary signal source, has particular utility and advantageous application for conveying signals to remotely located work stations. Under such circumstances the signal generally must pass through one or more relay devices 20 spaced along the conduits 14 at locations which permit the signal to reach the relays 20 before the actuating energy of the signal is lost. It will also be appreciated that the relay devices 20 positioned at spaced locations along the signal transmission line or conduits 14 preferably can provide a desirable amplification of the signal as well as further transmission thereof. In this way, the amplification provided by the relay dictates the distance between relays and permits controlled adjustment within the system. Another source of control within the system is to provide the relay with the capability of delaying the further transmission of the signal for a short but definite time period. This is illustrated schematically at 22 although it will be appreciated that a small delay is necessarily associated with each relay unit.

The primary source of the optical spectrum energy signal should be capable of emitting a high intensity signal which is preferably concentrated and directed toward the signal transmitting conduit so that minimum losses occur within the system. In accordance with the preferred embodiment of the invention, the primary signal source produces a high intensity luminous energy signal. Accordingly, the invention will hereinafter be described in connection with a visible or luminous energy signal although it will be appreciated that the system may utilize other radiant energy signals with success.

High intensity luminous energy may be obtained from a variety of sources. For example, the source may be an electrical or electronic device, an electrically actuated chemical reaction as typified by the brilliant flash obtained from a photographic flashbulb or the high intensity light of a carbon arc, or it may be a chemically initiated light source such as the light produced by an explosion or in an inert gas by subjecting the gas to explosive shock waves. As will be appreciated, the source preferably produces a high intensity noncoherent luminous energy signal over a short duration and is frequently of a nature which is self-destructive and therefore incapable of repetitive operation. The requisite intensity and duration (i.e. luminous flux) of the energy signal at the source may vary depending, among others, on the distance it must travel before reaching a target as well as the capability of the target to absorb and utilize the signal. In this connection, satisfactory results have been achieved with flash cubes having a luminous flux of about 400 lumens and a duration of less than 50 milliseconds. It will, of course, be appreciated that some of the sources mentioned hereinbefore are capable of repetitive operation, although in systems using the preferred pyrotechnic relay devices, such primary sources of radiant energy are not necessarily required.

The signal transmitting conduits of the system of the present invention include an optical collecting and signal transmission medium which permits transport of the signal along a course which may involve many changes in direction. Consequently, the conduits are flexible, light conveying members preferably taking the form of filamentary bundles having an energy pickup end adjacent the primary light source and a light discharge or emitting end positioned adjacent and directed toward either the light sensitive pyrotechnic target material of the relay device 20 or a suitable light sensitive member at the work station. The light transmitting conduits may be formed of a bundle of optically distinct filaments of small diameter which are highly transparent to the energy signal employed. Accordingly the conduit may be formed of glass or plastic materials and may additionally include a coating of glass or plastic of lower refractive index. The ends of the filaments within the bundle are generally secured or bonded together and may be sheathed in a protective coating of any suitable material such as an epoxy resin. The bundle of filaments forming the flexible conduit may vary in cross-sectional configuration, i.e., they may be square or round, and the ends of the conduit may be secured in position adjacent the light source and the light sensitive target with suitable bonding means to assure the most beneficial emission of the light signal from the conduit against the target member. It will be appreciated that the filaments within the signal transmission conduits, by suitabe bonding, may be hermetically sealed to the light sensitive targets of the relay device or work station and may be used alone or in conjunction with a refracting lens over the emitting ends thereof. Frequently it is desirable to reduce, concentrate or elongate the emitting end of the conduit by drawing the fibers to a smaller diameter. It will, of course, also be appreciated that individual filaments or groups of filaments may contact or abut the light source in such a manner as to collect substantially all the light emitted by the light source or suitable reflectors may be provided in the light source so as to direct substantially all the light in a single direction where it is picked up by the filamentary signal conduit. It will also be appreciated that the form of the conduit may vary so that rather than utilizing a bundle of filaments, the conduit may take the form of flexible tubes, rods or threads which can be used either individually or in combination. In general, the highly transparent materials utilized for the signal transmission conduits are glass and plastic materials which are specifically constructed to function in the manner of a fiberoptic. Therefore, the material may have various glass compositions or may include quartz or clear plastic materials such as the well known clear acrylic, polystyrene and polycarbonate plastics.

The light conveying conduit formed of a bundle of filaments as described is inherently flexible along any longitudinal portion thereof and therefore facilitates use in a variety of installations regardless of the manufacturing variations and tolerances. It is particularly useful in those systems requiring passage of the signal along an irregular path. Moreover, with only the ends of the light conveying conduits being bonded together or rigidly held, the emitting ends of the conduits may be shaped to conform to a desired curved contour at their point of exit prior to or during installation.

Figure 2:
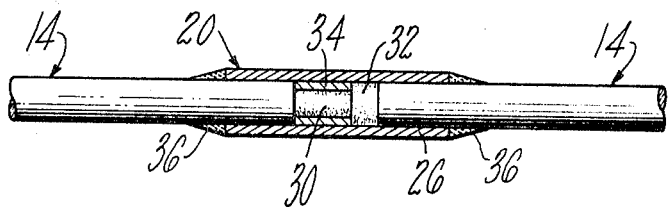
FIG. 2 is a sectional view of one embodiment of a relay device utilized in the system of the present invention.

Referring now specifically to FIG. 2, there is shown one embodiment of a relay device 20 in assembly with light transmitting conduits of the signal transmitting system. The device 20 comprises in its simplest form an elongated tubular housing 26 and a compacted pyrotechnic or explosive charge centrally positioned within the housing. The charge may consist of a single combustible mix or may, as illustrated in FIG. 2, comprise a light responsive target portion 30 for absorbing and collecting the light signal emitted from the conduit and a light producing booster portion 32 for emitting an amplified light signal. The target portion 30 may advantageously take the form of a column confined within an internal sleeve 34 and may vary in length, it being understood that an increase in length results in an increase in burning time. Generally the target 30 is less than an inch in length and preferably about ¼" to ¾" long. As shown, the booster portion 32 intimately contacts the target portion 30 and takes the form of a compressed pellet which fills the entire cross-sectional area of the housing cavity.

As mentioned hereinbefore the emitting end of the signal transmission conduit directs the signal toward a light responsive member or target of either a relay device or work station. In accordance with the present invention, the target 30 of the relay device is preferably a pyrotechnic material sensitive to a luminuos energy signal. However, materials sensitive to other regions of the optical spectrum may be advantageously employed. The target material should be generally capable of absorbing and accumulating the energy within the signal and, upon reaching a certain energy level, igniting to perform the desired work function. In other words, the material should exhibit high absorption and low conduction of radiant energy coupled with low thermal conductivity. In the relay shown in FIG. 2, target ignition will cause ignition of the booster charge 32 thereby providing an amplified luminous energy signal for further transmission. As shown, the signal transmitting conduits 14 are held within the housing 26 at both the input and output ends thereof by means of the seals 36, thereby providing for receipt, emission and transmission of the light signals.

Typical of the materials which may be utilized in the pyrotechnic target charge are mixtures of boron and red lead, boron and barium chromate, silicon and lead dioxide, and lead azide. Although white materials have been successfully used, it appears that surface treatment of such material with graphite or other dark material increases the absorption and reduces the ignition period. As mentioned hereinbefore, these pyrotechnic materials will provide a slight delay in the signal transmission. This results primarily from the rate of combustion along the length of the pyrotechnic material and can be controlled in numerous ways such as by varying the length of the charges.

The booster charge 32 is preferably comprised of material which emits a light signal of higher intensity than that received by the target 30. Generally these materials are mixtures of metal and suitable oxidizing agents similar to the materials used in flashbulbs; however, explosive as well as pyrotechnic materials may be used. The materials employed may include those having a high output in the infrared region of the spectrum with significantly less sensitivity in the visible region than the target material. One material exhibiting consistently satisfactory results is titanium aluminum potassium perchlorate. Other booster materials include mixtures of metals such as magnesium, zirconium and/or aluminum with nitrate, perchlorate or oxide oxidizers such as barium nitrate, sodium nitrate, strontium nitrate, potassium perchlorate, barium peroxide, iron oxide or lead oxide. A mixture of palladium and aluminum ("Pyrofuse" sold by Sigmund Cohn Corporation) may also be used. It will also be appreciated that the luminous energy signal emitted by such booster materials may be amplified by adding light intensifying materials, if desired.

Figure 3:
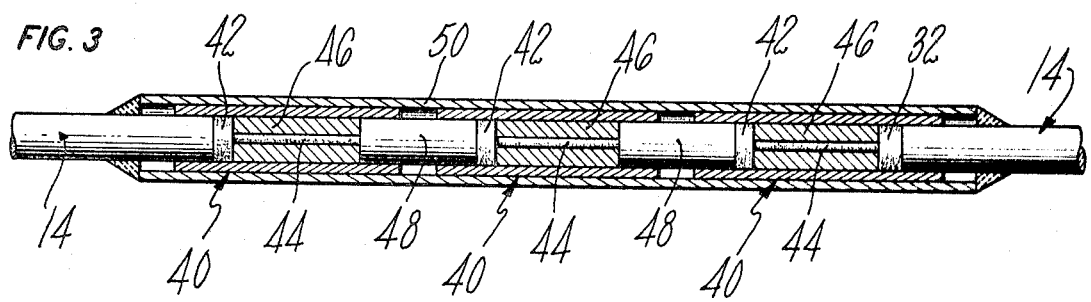
FIG. 3 is a sectional view similar to FIG. 2 illustrating another embodiment of a relay device comprising a plurality of assembled delay units.

Referring now to FIG. 3, there is shown another embodiment of the relay device of the present invention incorporating a plurality of indivdual relay and delay units 40 in assembled relationship. Advantageously, the use of a number of relatively small units 40 permits a controlled or selected total delay for a particular signal within isolated conduits of the system. It will be noted that while the relay and delay units are substantially similar to the relay device of FIG. 2, the tandem arrangement of the units obviates the necessity for amplification between each unit. Thus, as shown, each unit 40 is provided with a pyrotechnc charge which includes a target portion 42 and an elongated column of a pyrotechnic delay mix 44 within a sleeve 46 similar to sleeve 34 of FIG. 2. Each unit 40 is connected by a short length of light transparent conduit 48 and the entire assembly is housed within the tubular member 50. Of course, the final unit 40 preferably also includes a booster portion 32 since the signal emitted by the relay and delay device 22 may travel over a substantial distance before reaching the light sensitive target of either a subsequent relay member or a work station. It will, of course, also be appreciated that a portion of the luminous energy signal may be intercepted midway along the relay by a branched conduit without substantially interfering with the operation of the signals conveyed along each branch of the energy transmission conduit. In this manner substantial flexiblity is provided since amplification of the signal and time control thereof can be easily built into the system in a relatively simple manner.

The pyrotechnic delay mix 44 may be comprised of any suitable delay material. It is generally preferred that chromate or permanganate compositions be employed. For example, mixtures of barium chromate and/or potassium permanganate with zirconium/nickel alloys, boron, manganese, tungsten, niobium or tantalum may be used. It will, of course, be appreciated that many of the pyrotechnic mixtures mentioned may include inorganic or organic binders, extenders or modifiers and may be formed as extruded, cast, pressed or loosely compacted members.

As an example of the effectiveness of the system of the present invention, it has been found that work stations or relay devices spaced from the primary source of the luminous energy signal by distances of 6 to 10 feet and along courses which constantly bend and twist, have been effective in reliably igniting light sensitive pyrotechnic materials such as the boron red lead mixture and that such mixtures have been effective in causing repeated ignition thereof when spaced in a manner as depicted in FIG. 3.

Thus, it will be appreciated that a signal transmission system unaffected by electrical or magnetic fields can be provided for transmitting a radiant energy signal to a plurality of work stations far removed from the primary energy source. Additionally, the system permits the tandem assembly of delay units within the relay system to selectively control the sequence of operations at the work stations, the delay units being capable of effecting delays in the range of 60 milliseconds per linear foot of relay device. However, it will be appreciated that the delay may be varied both by the size and type of materials utilized within the delay device. Additionally, the system makes it possible to hermetically seal the individual delay units and place them in tandem orientation without disrupting their hermetic seal, thereby assuring freedom from adverse environmental effects.

As will be apparent to persons skilled in the art, various modifications and adaptations of the structure above-described will become readily apparent without departure from the spirit and scope of the invention.

We claim:

1. A pyrotechnic light transmission system comprising a primary source of a high intensity noncoherent light signal, a pyrotechnic target located remotely of the primary source, said target being ignitable by a light signal upon accumulation thereof, a light signal transmitting conduit between the primary source and the target having a first end intimately associated with the primary source for receiving the light signal to be transmitted through the conduit and a second end intimately associated with the target for directing a transmitted light signal against the target for ignition thereof, a pyrotechnic relay device positioned intermediate said first and second ends for receiving the light signal from the primary source and emitting a corresponding light signal toward said target, the relay device including a light activated pyrotechnic charge capable of producing the emitted light signal.

2. The system of claim 1 wherein the conduits include flexible bundles of filaments transparent to the light signal.

3. The system of claim 1 wherein the charge includes a delay mixture.

4. In a light transmission system comprising a light signal source, a signal sensitive target located remotely of the source and a signal transmitting conduit communicating with both the target and the source, the combination wherein the conduit includes a pyrotechnic relay device capable of both receiving and emitting a light signal, said device having a signal receptor possessing high absorption and low conduction of the light signal and a booster associated with the receptor for emitting a light signal substantially amplified relative to the signal received by the receptor, said relay device including a delay member intermediate the receptor and the booster.

5. A light responsive pyrotechnic relay device for receiving and transmitting noncoherent light signals comprising an elongated housing having an inlet port for receiving the emitting end of a first light transmitting conduit and an outlet port for receiving the pickup end of a second light transmitting conduit, and a charge of pyrotechnic material positioned within the housing for accumulating the light emitted from the first conduit, said charge being ignitable by the accumulated light and producing upon ignition a noncoherent light signal for transmission by the second conduit positioned within the outlet port of the device.

6. The relay device of claim 5 wherein the signal is comprised of luminous energy and the pyrotechnic material is sufficiently sensitive to the signal to ignite upon receipt thereof.

7. The relay device of claim 5 wherein the charge includes a column of pyrotechnic delay material.

8. The relay device of claim 5 wherein the conduit is a flexible transparent filamentary member.

References Cited

UNITED STATES PATENTS 3,351,016  11/1967  Simpson _____ 102—70.2
3,362,329  1/1968   Epstein _____ 102—70.2

SAMUEL FEINBERG, Primary Examiner

T. H. WEBB, Assistant Examiner

U.S. Cl. X.R.

102—18, 28 R